US008331717B2

(12) United States Patent
Hou et al.

(10) Patent No.: US 8,331,717 B2
(45) Date of Patent: Dec. 11, 2012

(54) METHOD AND APPARATUS FOR REDUCING BLOCK NOISE

(75) Inventors: Pei-Lin Hou, Taiwan (CN); Chih-Jung Lin, Taiwan (CN); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 798 days.

(21) Appl. No.: 12/515,802

(22) PCT Filed: Oct. 2, 2008

(86) PCT No.: PCT/JP2008/002770
§ 371 (c)(1),
(2), (4) Date: May 21, 2009

(87) PCT Pub. No.: WO2009/044549
PCT Pub. Date: Apr. 9, 2009

(65) Prior Publication Data
US 2010/0061649 A1    Mar. 11, 2010

(30) Foreign Application Priority Data
Oct. 3, 2007  (JP) ................................. 2007-259475

(51) Int. Cl.
*G06K 9/40*        (2006.01)
(52) U.S. Cl. ... 382/260; 348/576; 348/465; 375/240.03; 375/240.29; 382/233; 382/261; 382/266; 382/268
(58) Field of Classification Search .................. None
See application file for complete search history.

(56) References Cited

U.S. PATENT DOCUMENTS
5,367,385 A * 11/1994 Yuan ............................. 358/465
(Continued)

FOREIGN PATENT DOCUMENTS
JP              9-187008 A        7/1997

OTHER PUBLICATIONS

Bhaskar Ramamurthi et al., "Nonlinear Space-Variant Postprocessing of Block Coded Images," IEEE Transactions on Acoustics, Speech and Signal Processing, IEEE Inc. New York, USA, vol. 34, No. 5, Oct. 1986, pp. 1258-1268, XP000349257, ISSN: 0096-3518.

(Continued)

*Primary Examiner* — Tsung-Yin Tsai
(74) *Attorney, Agent, or Firm* — Greenblum & Bernstein, P.L.C.

(57) ABSTRACT

Block noises at block boundaries are removed, but when a contour line in the original image matches a block boundary, the degree of block noise removal is adjusted and image quality is improved. An adaptive filter has a step of calculating the weight of pixels near the block boundary by a high-pass filter, and a step of determining an adjusted value for the pixels near the block boundary based on the weight. The pixel values near the block boundary are adjusted and block noises are removed. A low-pass filter is applied to pixels near the block boundary to determine a filtered value. The adjusted values of the pixels near the block boundary are determined by obtaining a weighted sum of the original pixel value and the filtered value. Because the high-pass filter recognizes the definition of pixels near the block boundary, and the low-pass filter reduces the difference between pixels near the block boundary, the adaptive filter outputs the adjusted value, and this value removes block noise while retaining image definition.

8 Claims, 12 Drawing Sheets

U.S. PATENT DOCUMENTS

| | | | |
|---|---|---|---|
| 5,454,051 A * | 9/1995 | Smith | 382/233 |
| 6,041,145 A | 3/2000 | Hayashi et al. | |
| 6,167,164 A * | 12/2000 | Lee | 382/261 |
| 6,240,135 B1 | 5/2001 | Kim | |
| 6,504,873 B1 * | 1/2003 | Vehvilainen | 375/240.29 |
| 6,539,060 B1 * | 3/2003 | Lee et al. | 375/240.29 |
| 6,847,738 B1 * | 1/2005 | Scognamiglio et al. | 382/260 |
| 7,003,174 B2 * | 2/2006 | Kryukov et al. | 382/266 |
| 7,095,787 B2 | 8/2006 | Kadono et al. | |
| 7,373,013 B2 * | 5/2008 | Anderson | 382/261 |
| 2002/0067432 A1 * | 6/2002 | Kondo et al. | 348/576 |
| 2003/0026337 A1 * | 2/2003 | Hong | 375/240.03 |
| 2003/0044080 A1 * | 3/2003 | Frishman et al. | 382/268 |
| 2003/0053708 A1 * | 3/2003 | Kryukov et al. | 382/261 |
| 2003/0138154 A1 | 7/2003 | Suino | |
| 2005/0135700 A1 * | 6/2005 | Anderson | 382/261 |
| 2005/0276505 A1 | 12/2005 | Raveendran | |
| 2006/0239360 A1 | 10/2006 | Kadono et al. | |
| 2007/0098066 A1 | 5/2007 | Xue et al. | |
| 2007/0104269 A1 | 5/2007 | Xue et al. | |
| 2008/0069245 A1 | 3/2008 | Kadono et al. | |
| 2008/0130761 A1 | 6/2008 | Kadono et al. | |
| 2008/0152244 A1 | 6/2008 | Suino | |
| 2008/0175510 A1 * | 7/2008 | Matsushita | 382/260 |

OTHER PUBLICATIONS

Wang et al., "Gradient Inverse Weighted Smoothing Scheme and the Evaluation of its Performance," Computer Graphics and Image Processing, Academic Press, Inc. New York, vol. 15, No. 2, Feb. 1981.

Extended European Search Report (including the supplemental European Search Report and the European Search Opinion) dated Nov. 30, 2010 that issued with respect to European Patent Application No. 08835734.8.

* cited by examiner

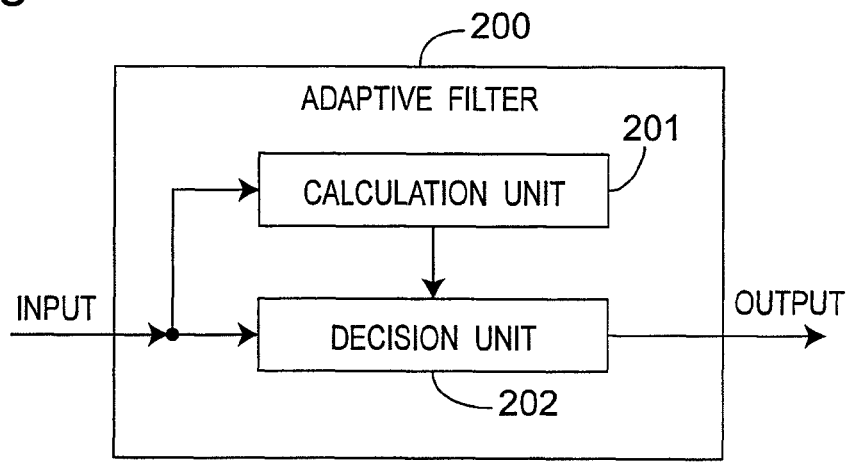
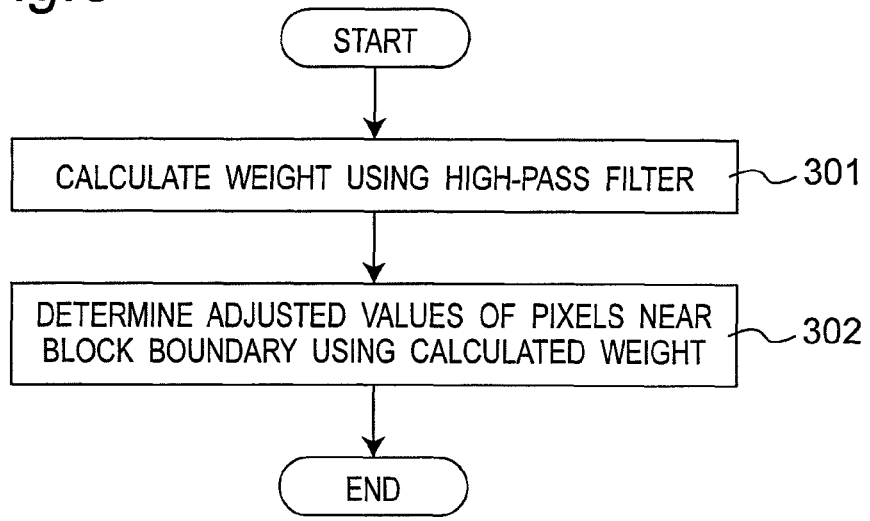
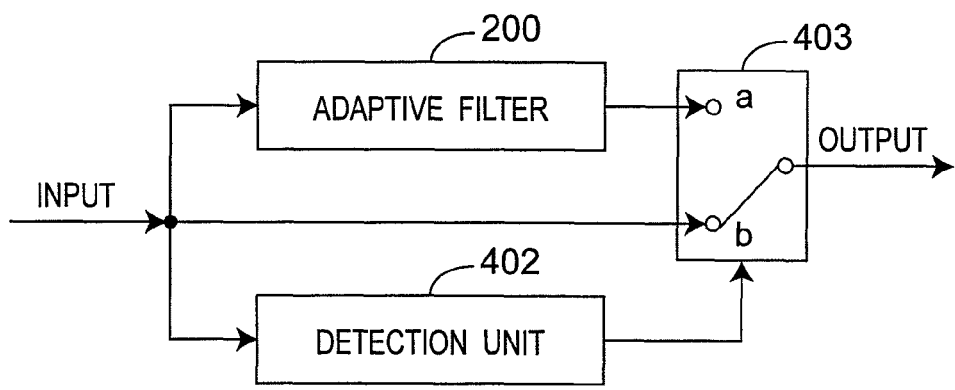

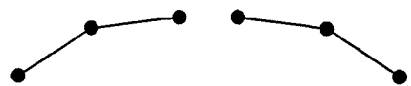
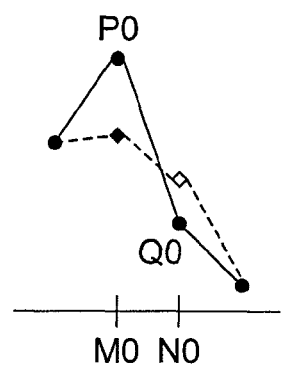
Fig.10B
Fig.11A
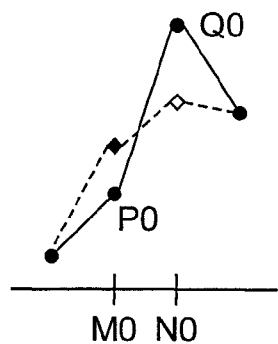
Fig.11B
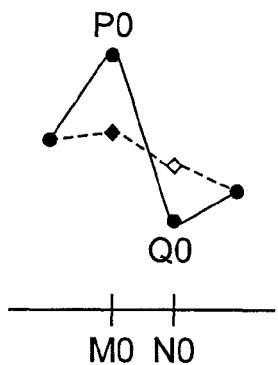
Fig.11C

|HPF(M0)| < |HPF(N0)|

|HPF(M0)| > |HPF(N0)|

|HPF(M0)| = |HPF(N0)|

|HPF(M0)|<|HPF(N0)|

|HPF(P0)| = |HPF(Q0)|

METHOD AND APPARATUS FOR REDUCING BLOCK NOISE

TECHNICAL FIELD

The present invention relates to an apparatus and a method of improving image quality and calculating an adjusted value that is related to pixels near the block boundary by using an adaptive filter. More specifically, the invention relates to an adaptive filter for removing block noise or blocking artifacts.

Block noise occurs when a still image is compressed such as in a JPEG file or video is compressed such as in an MPEG file. Such compressed images are widely used in movies, television programs, and multimedia streaming applications. The invention takes an image containing block noise, and then by using an adaptive filter improves the image quality and calculates an adjusted value related to pixels near the block boundary. The adaptive filter is composed of a high-pass filter for calculating weight, and a low-pass filter for calculating a filter value that reduces pixel discontinuity near the block boundary. The adaptive filter determines the adjusted value by calculating a weighted sum of the original pixel value and the filter value.

The invention can be used in image processing devices such as DVD players and digital cameras, computer programs, and image display devices such as liquid crystal displays, plasma display panels, and CRT monitors.

BACKGROUND ART

U.S. Pat. No. 6,240,135 teaches a method of encoding moving pictures using a plurality of blocks. This method includes a step of defining pixel sets S0, S1, S2 around a block boundary, a step of selectively determining a deblocking mode as a default mode or a DC offset mode depending on the degree of block noise after acquiring a mode decision value, a step of obtaining frequency information around the block boundary per pixel using a 4-point DCT kernel if the default mode is selected, a step of replacing a magnitude of a discontinuous component belonging to the block boundary with a minimum magnitude of discontinuous components belonging to the surroundings of the block boundary in the frequency domain, a step of applying the replacing step to the spatial domain, a step of deciding if it is necessary to execute the DC offset mode if the DC offset mode is selected, and a step of removing the block noise in a smooth region if executing the DC offset mode is decided to be necessary. A flow chart of this method of the related art is shown in FIG. 1.

This method of the related art uses two modes, the default mode and the DC offset mode, to adjust the pixel values causing block noise. In the default mode frequency information for each pixel near the block boundary is acquired using a 4-point DCT kernel. The magnitude of a discontinuous component belonging to the block boundary is replaced with a minimum magnitude of discontinuous components belonging to the surroundings of the block boundary in the frequency domain. Low-pass filtering is applied in the DC offset mode. Only the boundary pixel values are corrected in the default mode. The default mode is thus not sufficient for removing block noise in extremely smooth regions, such as settings in photographs. Block noises in smooth regions are therefore removed in the DC offset mode.

This method of the related art applies a DCT-based filter or a low-pass filter to pixels along the block boundary to smoothen discontinuities caused by extremely smooth regions. The low-pass filter is used in extremely smooth regions, and the DCT-based filter is used in other regions. Because differences between pixels surrounding the block boundary are reduced by using these filters, discontinuity is reduced and block noise can be removed. However, the DCT-based filter or low-pass filter not only reduce abnormal discontinuities, it also removes natural changes between pixels. Image definition is lost as a result of removing natural changes between pixels. This method of the related art removes block noise and poor definition using a DCT-based filter or low-pass filter. As a result, the value of the image also drops.

Block noises are produced at the block boundary when the pixel values along the block boundary create abnormal discontinuities. The method of the related art applies a DCT-based filter or low-pass filter to pixels along the block boundary to smooth the discontinuities. However, the DCT-based filter or low-pass filter not only reduces abnormal discontinuities, it also removes natural changes between pixels. The conventional method of removing block noise results in a poorly defined image and image quality drops.

DISCLOSURE OF INVENTION

The present invention reduces abnormal discontinuities around the block boundary by using an adaptive filter. The pixel weight of the adaptive filter around the block boundary is obtained using a high-pass filter, and the adjusted value related to the pixels around the block boundary is obtained using weighting. The high-pass filter applied to pixels on each side of the block boundary recognizes the characteristics of pixels around the block boundary. When the line connecting the brightness level of a target pixel and the pixels adjacent thereto on both sides has an inverted V shape, the high-pass filter value is positive, and the high-pass filter value is negative when this line has a V shape. As the absolute value of the high-pass filter value rises, the angle of the inverted V shape or V shape becomes more acute.

Note that the target pixel is a pixel at a position adjacent to the block boundary.

Note further that the shape of the line connecting the brightness levels is referred to as an "inverted V shape" and "V shape" because these shapes are easy to visualize, but an "inverted V shape" is used when the second differential of a function that is an approximate curve or an approximate line smoothly connecting the target pixel and the pixels adjacent thereto is negative, and a "V shape" is used when the second differential is positive. The angle of the inverted V shape or V shape becoming more acute means that the absolute value of the second differential becomes greater.

The definition of continuous pixels can then be recognized by the output level of the high-pass filter. The output level of the high-pass filter describes the degree of change in continuous pixels. Output of a high level means high definition forming a peak. Conversely, output of a low level means low definition forming a shape that is not a peak. Natural change between pixels and abnormal discontinuities are calculated from the high-pass filter output. By using a weight determined using the high-pass filter, the adaptive filter calculates an adjusted value for pixels near the block boundary. When the adjusted value related to pixels around the block boundary is calculated, the characteristics of pixels around the block boundary are recognized through weighting and examined by the adaptive filter.

The present invention therefore reduces abnormal discontinuities and retains natural change around the block boundary. Image quality can be improved when block noises are removed.

The difference between the brightness levels of the two pixels perpendicularly adjacent to a contour line in the original image is great. If this contour line matches a boundary between one block and another block, and a low-pass filter that removes block noise is applied to change the contour line to a smooth brightness change with gradation, the contour line becomes blurred and the definition of the original image is impaired. However, when a contour line is believed to match a boundary between one block and another block, the present invention can adjust the filter value of the low-pass filter so that the contour line is not blurred.

BRIEF DESCRIPTION OF DRAWINGS

FIG. 2 is a block diagram of an apparatus according to the present invention that reduces block noise.

FIG. 3 is a flow chart describing a process of the invention for calculating the adaptive filter 200.

FIG. 4 is a block diagram of another apparatus according to the present invention that reduces block noise.

FIG. 10B is a schematic view describing the definition of a high-pass filter according to the present invention.

FIG. 11A is a schematic view describing the operation of a high-pass filter according to the present invention.

FIG. 11B is a schematic view describing the operation of a high-pass filter according to the present invention.

FIG. 11C is a schematic view describing the operation of a high-pass filter according to the present invention.

Figure 1:
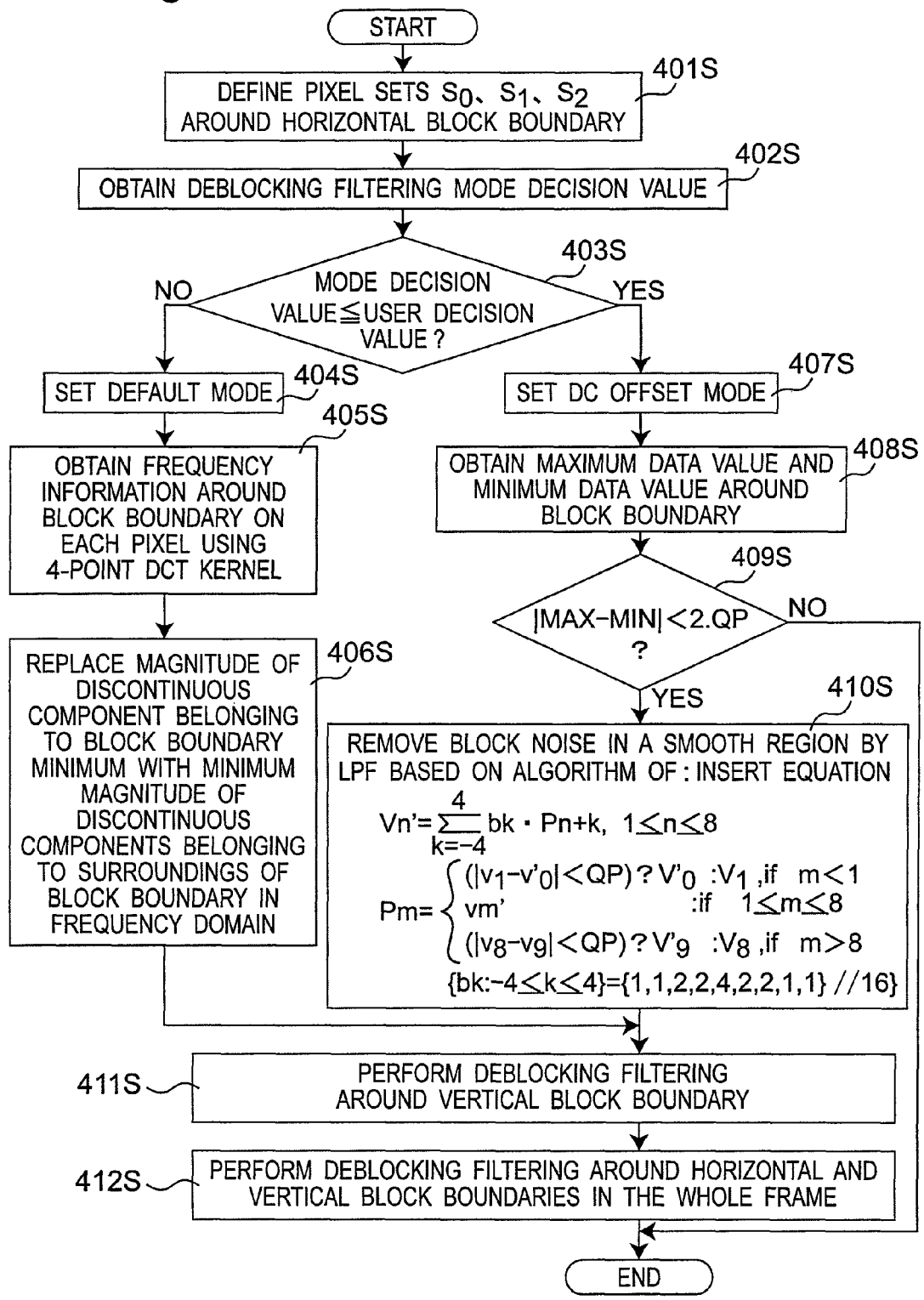
FIG. 1 is a flow chart describing the process of the related art.

KEY TO THE FIGURES 200 adaptive filter
201 calculation unit
202 decision unit
402 detection unit
403 switch
603 high-pass filter
604 weight calculation unit
605 low-pass filter
606 weighted sum calculation unit

BEST MODE FOR CARRYING OUT THE INVENTION

An apparatus for removing block noise is described below with reference to the block diagram in FIG. 2. An apparatus for removing block noise has an adaptive filter 200 that calculates an adjusted value. The adaptive filter 200 includes a calculation unit 201 that calculates weight by a high-pass filter, and a decision unit 202 that determines pixel values near the block boundary by using the calculated weight.

The adaptive filter 200 takes input image data and outputs an adjusted value. In the adaptive filter 200 the calculation unit 201 calculates the weight of pixels around the block boundary by using the output of a high-pass filter that is applied to a plurality of pixels aligned across a block boundary. The pixel weight is output to the decision unit 202. The decision unit 202 takes the input image data and the output from the calculation unit 201, and determines the adjusted value using the original pixel value and the pixel weight.

The calculation process of adaptive filter 200 is shown in FIG. 3.

The weight of pixels around the block boundary is calculated in step 301 using a high-pass filter. The weight calculated in step 301 is used to determine the adjusted value related to pixels around the block boundary in step 302.

The apparatus for removing block noise also has a detection unit 402 and switch 403 as shown in FIG. 4.

The adaptive filter 200 is identical to the adaptive filter 200 shown in FIG. 2 except for the output, and is connected to the switch 403.

The detection unit 402 takes the input image data and detects the noise pixels creating a block noise. The output of the detection unit 402 is connected to the switch 403.

The switch 403 receives the input image data, the output from the adaptive filter 200, and the output from the detection unit 402. Based on the output from the detection unit 402, the switch 403 outputs the original pixel in the input image data or the adjusted value output from the adaptive filter 200. When the detection unit 402 detects noise pixels forming a block noise, the switch 403 outputs the adjusted value. Otherwise the switch 403 outputs the original pixel.

Figure 5:
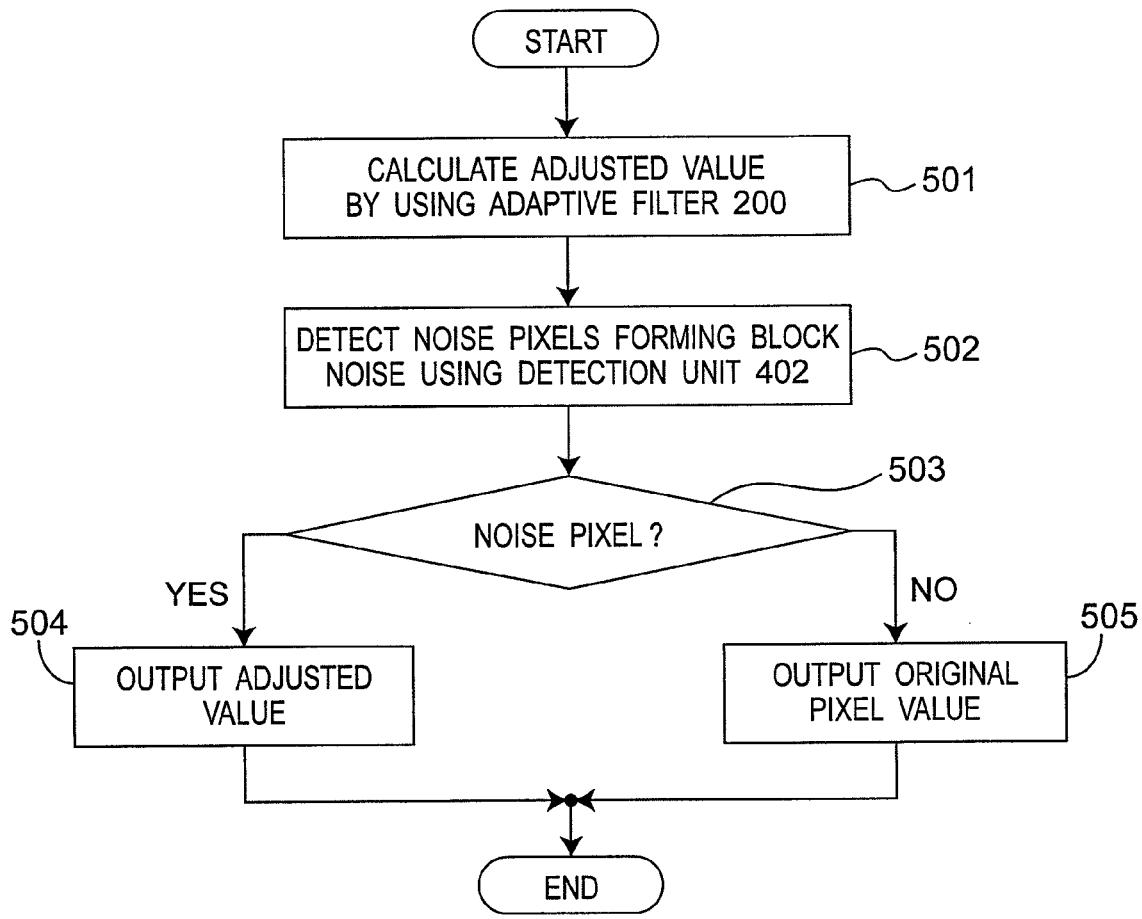
FIG. 5 is a flow chart describing a calculation process using the apparatus of the invention shown in FIG. 4 for reducing block noise.

FIG. 5 is a flow chart of the calculation process. The adjusted value related to pixels around the block boundary is calculated in step 501 using the adaptive filter 200. In step 502 the detection unit 402 detects noise pixels forming a block noise. The operation of the switch 403 references steps 503, 504, and 505. Two of the steps are separated based on whether or not the pixel is confirmed to be a noise pixel in step 503.

If a noise pixel is detected, control goes to step 504 and the switch 403 outputs the adjusted value. Otherwise, control goes to step 505 and the switch 403 outputs the original pixel.

Note that because the order of steps 501 and 502 does not affect the result of the process, the order of steps 501 and 502 can be reversed or the steps can be executed simultaneously.

<First Embodiment>

Figure 6:
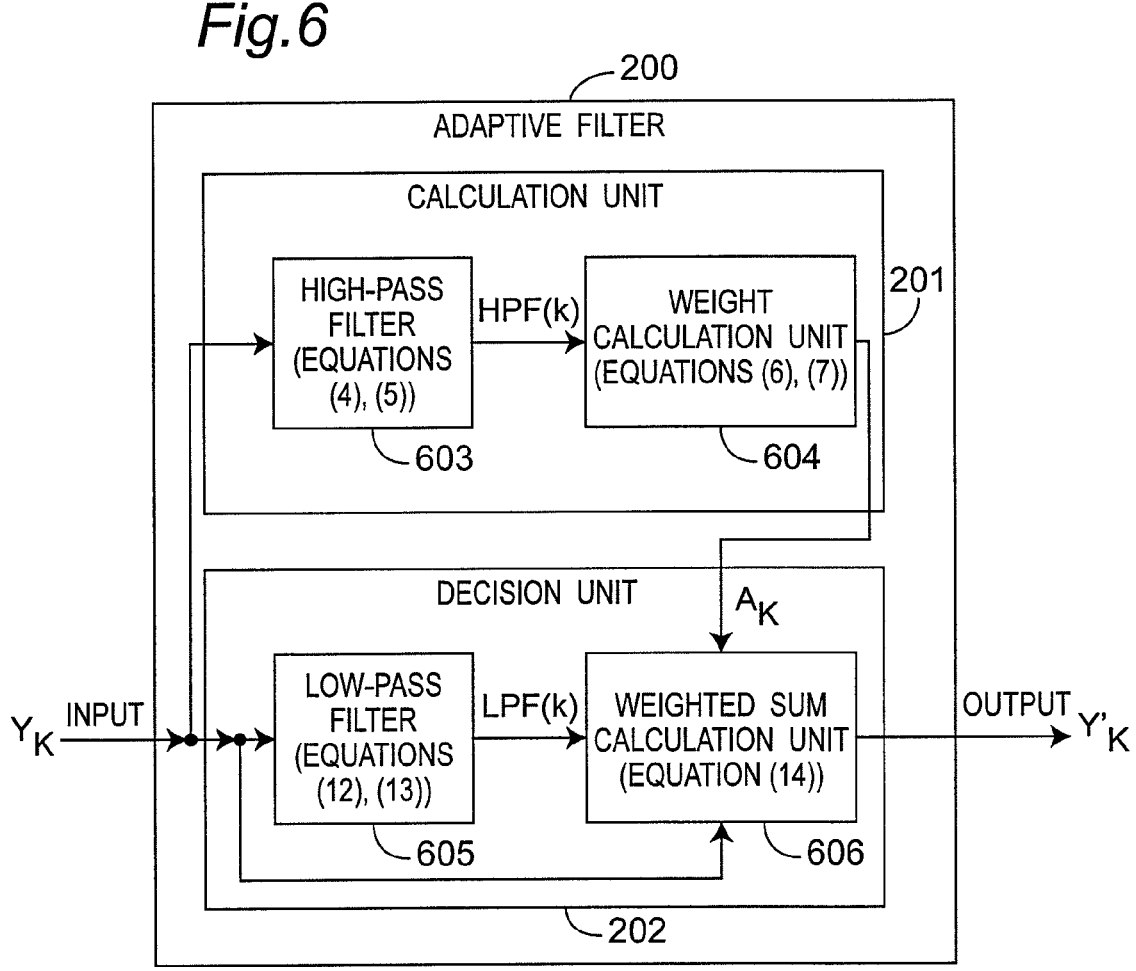
FIG. 6 is a block diagram showing a first embodiment of an apparatus according to the present invention that reduces block noise.

A first embodiment of the invention is described with reference to FIG. 6 and FIG. 8. A block diagram of the first embodiment is shown in FIG. 6.

The first embodiment of the invention has an adaptive filter 200 for calculating an adjusted value. The adaptive filter 200 includes a calculation unit 201 that calculates a weight, and a decision unit 202 that determines pixel values near the block boundary using the weight.

The adaptive filter 200 takes an input image and outputs an adjusted value. In the adaptive filter 200 the calculation unit 201 takes the input image data and calculates the weight of pixels around the block boundary by using the output of a high-pass filter that is applied to a plurality of pixels aligned across a block boundary. The calculation unit 201 outputs the pixel weight to the decision unit 202. The decision unit 202 takes the input image data and the output from the calculation unit 201, and determines the adjusted value by calculating the weighted sum of pixels around the block boundary.

The calculation unit 201 also has a high-pass filter 603 and a weight calculation unit 604. The high-pass filter 603 takes the input image data, applies a filtering process to the pixels on each side of the block boundary, and outputs to the weight calculation unit 604. Vectors composed of coefficients of the high-pass filter 603 that filters the pixels horizontally and vertically are shown in equations (1) and (2) below.

$$[-1 \quad 2 \quad -1] \tag{1}$$

$$\begin{bmatrix} -1 \\ 2 \\ -1 \end{bmatrix} \tag{2}$$

Figure 7:
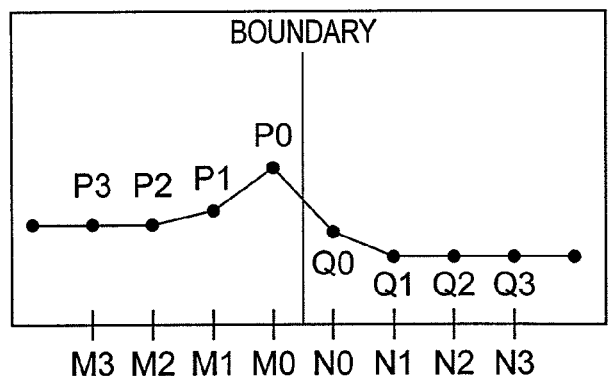
FIG. 7 is a schematic view describing an example of input image data composed of continuous horizontal pixels.

FIG. 7 shows the boundary between two horizontally adjacent blocks, pixels M0, M1, M2, and M3 arrayed to the left perpendicularly to the boundary, and pixels N0, N1, N2, and N3 arrayed to the right perpendicularly to the boundary. P0, P1, P2, and P3 denote the brightness level of pixels M0, M1, M2, M3, respectively, and Q0, Q1, Q2, Q3 denote the brightness level of pixels N0, N1, N2, N3, respectively.

The high-pass filter 603 outputs a high-pass filter value HPF that emphasizes the difference in the brightness levels of the target pixel and the pixels oppositely adjacent thereto (horizontally or vertically). The general equation of the high-pass filter value HPF(Xi) in this embodiment of the invention is shown in equation (3).

$$HPF(Xi) = [-1 \quad 2 \quad -1][L(i-1) Li L(i+1)]^T \tag{3}$$
$$= (-1)*L(i-1) + (2)*Li + (-1)*L(i+1)$$

where Li is the brightness level of the target pixel, and L(i-1) and L(i+1) are the brightness levels of the adjacent pixels on opposite sides of the target pixel (horizontally or vertically).

In FIG. 7, if the target pixel is a pixel adjacent to the boundary line, the high-pass filter value HPF(M0) of pixel M0 is determined by equation (4), and the high-pass filter value HPF(N0) of pixel N0 is determined by equation (5).

$$HPF(M0)=[-1 \quad 2 \quad -1][P1\ P0\ Q0]^T \tag{4}$$

$$HPF(N0)=[-1 \quad 2 \quad -1][P0\ Q0\ Q1]^T \tag{5}$$

The weight calculation unit 604 takes the output of the high-pass filter 603 and calculates the weight using equations (6), (7), (8) and (9).

$$A_{M0}=(HPF(M0)+HPF(N0))/HPF(M0) \tag{6}$$

$$A_{N0}=(HPF(N0)+HPF(M0))/HPF(N0) \tag{7}$$

$$A_{Mi}=1,\ if\ i\neq 0 \tag{8}$$

$$A_{Ni}=1,\ if\ i\neq 0 \tag{9}$$

where $A_{Mi}$ is the weight of pixel Mi, and HPF(Mi) is the high-pass filter value HPF(Mi) that is output by the high-pass filter 603 for pixel Mi. The weight is output to the decision unit 202 for determining the adjusted value. The weight of pixel M0 is determined using equation (6), and the weight of pixel N0 is determined using equation (7). Equation (8) shows that the weight of M1, M2, M3, . . . is 1, and equation (9) shows that the weight of N1, N2, N3, . . . is 1.

The operation applied to vertically contiguous pixels is similar to the operation applied to horizontally contiguous pixels. Further description thereof is redundant, and is therefore omitted here.

When the line connecting the brightness level of a target pixel and the pixels adjacent thereto on both sides has an inverted V shape, the high-pass filter value is positive, and the high-pass filter value is negative when this line has a V shape. As the absolute value of the high-pass filter value rises, the angle of the inverted V shape or V shape becomes more acute. The target pixel is a pixel at a position adjacent to the block boundary.

The decision unit 202 further includes a low-pass filter 605 and a weighted sum calculation unit 606. The low-pass filter 605 receives the input image data, is applied to pixels near the block boundary, and determines the value resulting from the filtering process. Vectors composed of coefficients of the low-pass filter 605 for filtering the pixels horizontally or vertically are shown in equations (10a) and (10b) below.

$$(1/4)[1 \quad 2 \quad 1] \tag{10a}$$

$$(1/4)\begin{bmatrix} 1 \\ 2 \\ 1 \end{bmatrix} \tag{10b}$$

The low-pass filter 605 outputs a low-pass filter value LPF that emphasizes the difference in the brightness levels of the target pixel and the pixels oppositely adjacent thereto (horizontally or vertically). The general equation of the low-pass filter value LPF(Xi) in this embodiment of the invention is shown in equation (11).

$$LPF(Xi) = (1/4)[1 \quad 2 \quad 1][L(i-1) Li L(i+1)]^T \tag{11}$$
$$= (1/4)\{(1)*L(i-1) + (2)*Li + (1)*L(i+1)\}$$

LPF(M0) is determined by equation (12), and LPF(N0) is determined by equation (13).

$$LPF(M0) = (1/4)[1\ 2\ 1][P1\ P0\ Q0]^T \quad (12)$$

$$LPF(N0) = (1/4)[1\ 2\ 1][P0\ Q0\ Q1]^T \quad (13)$$

The weighted sum calculation unit 606 takes the input image data, the value output by the low-pass filter 605 as the result of the filtering process, and the weight output by the weight calculation unit 604, and determines the adjusted value by calculating the weighted sum of the original pixel and the filtered value based on equation (14).

$$Y_K' = Y_K * A_K + LPF(K)*(1-A_K) \quad (14)$$

where $Y_K'$ is the adjusted brightness level of pixel K, $Y_K$ is the original brightness level of pixel K, and $A_K$ is the weight of pixel K output from the weight calculation unit 604. In addition, LPF(K) is the filtered value of pixel K, and is the output of the low-pass filter 605 at pixel K. As a result, the adjusted brightness level at pixels M0 and N0 is defined by the following equations.

$$Y(M0)' = Y(M0)*A_{M0} + LPF(M0)*(1-A_{M0}) \quad (15)$$

$$Y(N0)' = Y(N0)*A_{N0} + LPF(N0)*(1-A_{N0}) \quad (16S)$$

Figure 12A:
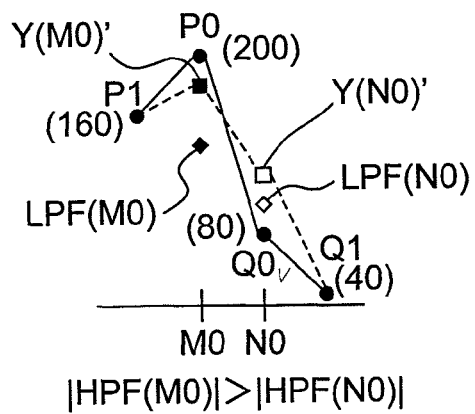
FIG. 12A is a schematic view describing the operation of an adaptive filter according to the present invention.

The calculations performed by the high-pass filter 603 in FIG. 6 using equations (4) and (5), the calculations performed by the weight calculation unit 604 using equations (6) and (7), the calculations performed by the low-pass filter 605 using equations (12) and (13), and the calculation performed by the weighted sum calculation unit 606 using equation (14) are described using real values with reference to FIG. 12A.

In FIG. 12A there is a block boundary between pixels M0 and N0. The brightness levels are 160 at P1, 200 at P0, 80 at Q0, and 40 at Q1. Because the difference between the brightness level P0 of pixel M0 and the brightness level Q0 of pixel N0 is relatively great, a contour line matching the block boundary is believed to exist in the original image.

The high-pass filter 603 performs the following calculations based on equations (4) and (5).

$$\begin{aligned}HPF(M0) &= [-1\ 2\ -1][160\ 200\ 80)]^T \\ &= (-1)*(160)+(2)*(200)+(-1)*(80) \\ &= -160+400-80 = 160\end{aligned} \quad (17)$$

$$\begin{aligned}HPF(N0) &= [-1\ 2\ -1][200\ 80\ 40)]^T \\ &= (-1)*(200)+(2)*(80)+(-1)*(40) \\ &= -200+160-40 = -80\end{aligned} \quad (18)$$

These two HPF values are sent to the weight calculation unit 604, which performs the following calculations using equations (6) and (7).

$$\begin{aligned}A_{M0} &= (HPF(M0)+HPF(N0))/HPF(M0) \\ &= (160+(-80))/4 = 20\end{aligned} \quad (19)$$

$$\begin{aligned}A_{N0} &= (HPF(N0)+HPF(M0))/HPF(N0) \\ &= ((-80)+160)/(-2) \\ &= 80/(-2) = -40\end{aligned} \quad (20)$$

The low-pass filter 605 performs the following calculations based on equations (12) and (13).

$$\begin{aligned}LPF(M0) &= (1/4)[1\ 2\ 1][160\ 200\ 80]^T \\ &= (1/4)\{(1)*(160)+(2)*(200)+(1)*(80)\} \\ &= (1/4)*640 = 160\end{aligned} \quad (21)$$

$$\begin{aligned}LPF(N0) &= (1/4)[1\ 2\ 1][200\ 80\ 40]^T \\ &= (1/4)\{(1)*(200)+(2)*(80)+(1)*(40)\} \\ &= (1/4)*400 = 100\end{aligned} \quad (22)$$

The following values are obtained if equations (19) and (21) are substituted in equation (15).

$$\begin{aligned}Y(M0)' &= 200*(1/2)+160*(1-(1/2)) \\ &= 180\end{aligned} \quad (23)$$

$$\begin{aligned}Y(N0)' &= 80*(-1)+100*(1-(-1)) \\ &= 120\end{aligned} \quad (24)$$

In FIG. 12A the value Y(M0)'=180 obtained from equation (23) is denoted by a black square, and the value Y(N0)'=120 obtained from equation (24) is denoted by a white square. In FIG. 12A the value LPF(M0)=160 obtained from equation (21) is denoted by a black diamond, and the value LPF(N0)=100 obtained from equation (22) is denoted by a white diamond.

Note that for the pixels other than the pixels M0 and N0 adjacent to the block boundary, that is, pixels M1, M2, M3, ..., Q1, Q2, Q3, ..., the adjusted brightness level shown in equation (14) is AK=1 as determined from equations (8) and (9). As a result, YK'=YK, and the input value is therefore the output value.

Figure 8:
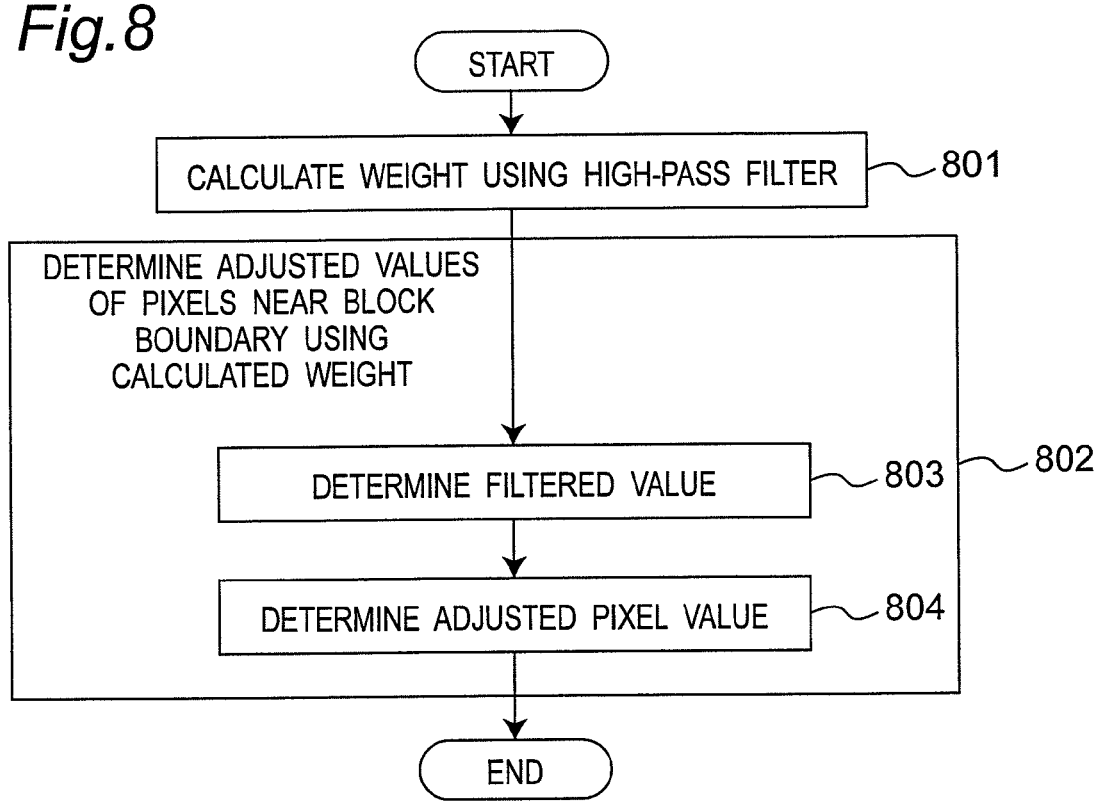
FIG. 8 is a flow chart showing the calculation process of an adaptive filter 600 according to the present invention.

The calculation process of the adaptive filter 200 is shown in FIG. 8.

The adaptive filter 200 calculates the weight by the high-pass filter in step 801. As described above, step 801 is executed by the high-pass filter 603 and weight calculation unit 604. Using the weight determined in step 801, the adjusted value is determined in step 802. Step 802 includes step 803 and step 804. In step 803 the low-pass filter 605 gets the input image data and determines the filtered value of the pixels around the block boundary. In step 804, the weighted sum calculation unit 606 calculates the weighted sum of the original pixel value and the filtered value using equation (14), and determines the adjusted sum. The mathematical and geometric characteristics and advantages of the present invention are described below.

The high-pass filter applied to pixels on each side of the block boundary recognizes the characteristics of contiguous pixels near the block boundary. The shape of a curve formed by contiguous pixels can be recognized from the sign (+/−) of the high-pass filter.

Figure 9A:
FIG. 9A is a schematic view describing the sign of a high-pass filter according to the present invention.
Figure 9B:
FIG. 9B is a schematic view describing the sign of a high-pass filter according to the present invention.

When the line connecting the brightness level of a target pixel and the pixels adjacent thereto on both sides has an inverted V shape, the high-pass filter takes a positive value (FIG. 9A), and the high-pass filter takes a negative value when this line has a V shape (FIG. 9B). As the absolute value of the high-pass filter value rises, the angle of the inverted V shape or V shape becomes more acute.

The target pixel is a pixel at a position adjacent to the block boundary.

Figure 10A:
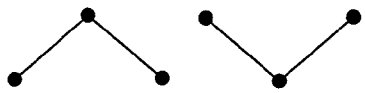
FIG. 10A is a schematic view describing the definition of a high-pass filter according to the present invention.
Figure 11D:
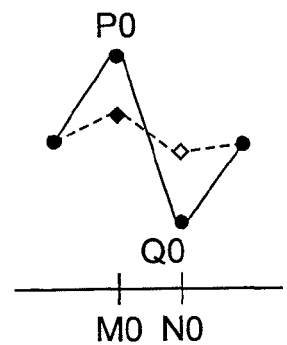
FIG. 11D is a schematic view describing the operation of a high-pass filter according to the present invention.
Figure 11E:
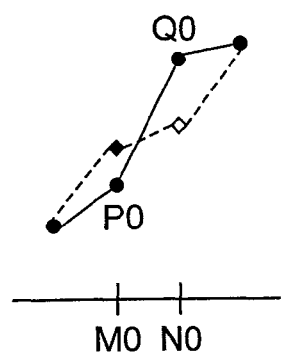
FIG. 11E is a schematic view describing the operation of a high-pass filter according to the present invention.
Figure 11F:
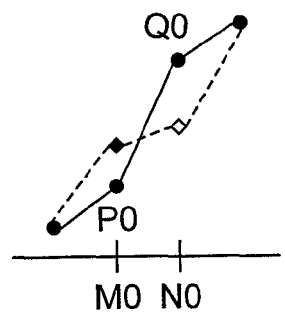
FIG. 11F is a schematic view describing the operation of a high-pass filter according to the present invention.

The degree of change in the brightness level of contiguous pixels can be recognized from the output level of the high-pass filter. As shown in FIG. 10A, when the output level of the high-pass filter is high, the change in the brightness level is abrupt and a peak is formed. Conversely, when the output level of the high-pass filter is low, a peak is not formed and the change in the brightness level is gradual. It can therefore be said that when the change in the brightness level is sharp enough to form a peak, the definition of the output image is high.

The low-pass filter applied to pixels around the block boundary determines the LPF value after the low-pass filtering process, and reduces the difference in the pixel value to around pixels. FIG. 11A, FIG. 11B, FIG. 11C, FIG. 11D, FIG. 11E, and FIG. 11F show comparisons between original pixel values and the pixel values after low-pass filtering. The original pixel values are denoted by a black circle. The LPF values after low-pass filtering pixel M0 are denoted by a black diamond. The LPF values after low-pass filtering pixel N0 are denoted by a white diamond. As shown in FIG. 11A to FIG. 11F, the filtered values of pixel M0 and pixel N0 are closer together than the original pixel values as a result of applying the low-pass filter to the pixels. Because the difference between pixels on opposite sides of the block boundary is reduced, block noise can also be reduced.

However, applying a low-pass filter not only decreases block noise, it also reduces definition. By using a high-pass filter, the invention recognizes the characteristics of contiguous pixels near the block boundary. By also using a low-pass filter, differences between pixel values on opposite sides of the block boundary can also be reduced. Block noise can therefore also be reduced, and when the change in the brightness level in the original image is great, the degree of change in the brightness level can be maintained without loss of image quality.

FIG. 12A, FIG. 12B, FIG. 12C, FIG. 12D, FIG. 12E, and FIG. 12F show several comparisons of the filtered LPF value and the adjusted $Y_K'$. The original pixel values are denoted by a black circle. The LPF values after low-pass filtering pixel M0 are denoted by a black diamond. The LPF values after low-pass filtering pixel N0 are denoted by a white diamond. The adjusted $Y_K'$ of pixel M0 is denoted by a block square, and the adjusted $Y_K'$ pixel N0 is denoted by a white square.

The adjusted $Y_K'$ is determined by calculating the weighted sum of the original pixel value and the filtered value. The weight that is used to calculate the weighted sum is determined by the high-pass filter. Therefore, if the output of the high-pass filter for the corresponding pixel is greater than the output of the high-pass filter for the pixel on the other side of the block boundary, the adjusted values of pixel M0 and pixel N0 will be closer to the original pixel value than the filtered value. Conversely, if the output of the high-pass filter for the corresponding pixel is lower than the output of the high-pass filter for the pixel on the other side of the block boundary, the adjusted values of pixel M0 and pixel N0 will be farther from the original pixel value than the filtered value.

Figure 12B:
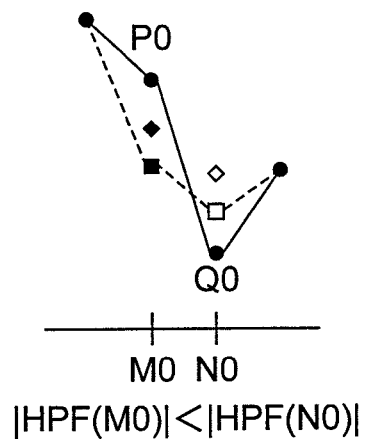
FIG. 12B is a schematic view describing the operation of an adaptive filter according to the present invention.
Figure 12C:
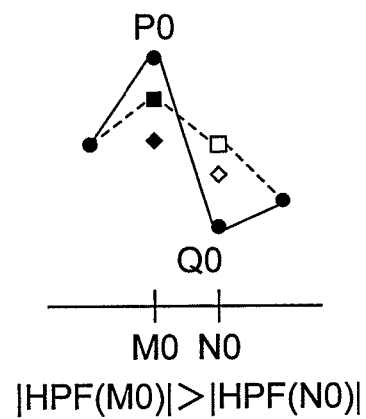
FIG. 12C is a schematic view describing the operation of an adaptive filter according to the present invention.

In the case shown in FIG. 12A and FIG. 12C, the high-pass filter output for pixel M0 is greater than the absolute value of the high-pass filter output for pixel N0. As a result, the adjusted value of pixel M0 is closer to the corresponding original pixel value than the filtered value. In addition, the absolute value of the high-pass filter output for pixel N0 is lower than the high-pass filter output for pixel M0. As a result, the adjusted value of pixel N0 is farther from the corresponding original pixel value than the filtered value.

Figure 12D:
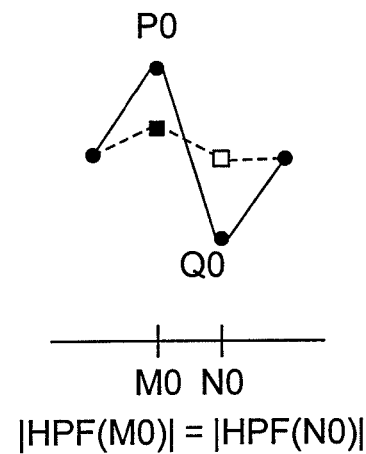
FIG. 12D is a schematic view describing the operation of an adaptive filter according to the present invention.
Figure 12E:
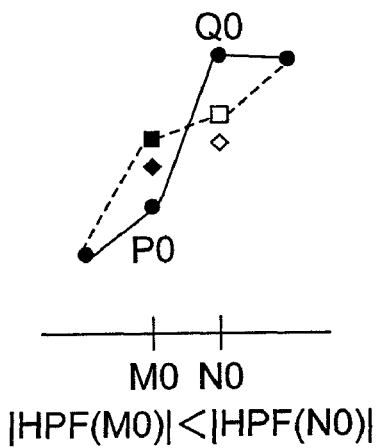
FIG. 12E is a schematic view describing the operation of an adaptive filter according to the present invention.

The opposite case, that is, the absolute value of the high-pass filter output for pixel M0 is less than the high-pass filter output for pixel N0, is shown in FIG. 12B and FIG. 12E. The description of this case is redundant, and is therefore not repeated here.

Figure 12F:
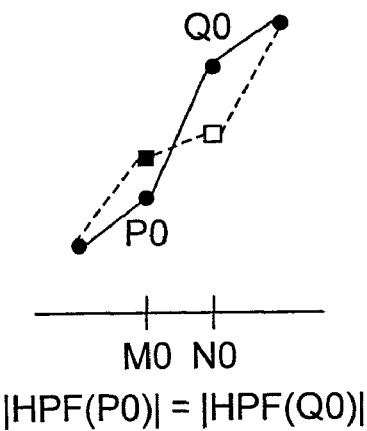
FIG. 12F is a schematic view describing the operation of an adaptive filter according to the present invention.

In the case shown in FIG. 12D and FIG. 12F, the absolute value of the high-pass filter output for pixel M0 is equal to the absolute value of the high-pass filter output of pixel N0, and the adjusted values of pixel M0 and pixel N0 are the same as the filtered values.

The block diagram shown in FIG. 6 is described using a different algorithm next.

First, pixel values P0 and Q0 of pixels M0 and N0 are obtained.

The low-pass filter values LPF(M0) and LPF(N0) of pixels M0 and N0 are then obtained, and the high-pass filter values HPF(M0) and PF(N0) of pixels M0 and N0 are obtained.

The absolute values |HPF(M0)| and |HPF(N0)| of the high-pass filter values are then compared to determine which is greater and which is smaller. Referring to FIG. 12A, this comparison is comparable to comparing angle P1-P0-Q0 and angle P0-Q0-Q1, and the smaller angle (the more acute angle) corresponds to the high-pass filter value with the greater absolute value.

For the high-pass filter value with the greater absolute value, that is, pixel M0 in FIG. 12A, the adjusted value Y(M0)' is set to an internal division point between pixel value P0 and low-pass filter value LPF(M0), and for the high-pass filter value with the smaller absolute value, that is, pixel N0 in FIG. 12A, the adjusted value Y(N0)' is set outside of pixel value Q0 and low-pass filter value LPF(N0) to an external division point from low-pass filter value LPF(N0).

Described with reference to FIG. 12A, the distance between LPF(M0) and Y(M0)' is substantially equal to the distance between LPF(N0) and Y(N0)', and changes according to the difference between the absolute values |HPF(M0)| and |HPF(N0)|. For example, if the difference increases the distance also increases, and the distance decreases if the difference decreases. Alternatively, the distance can be changed in steps, or it may always change a constant amount.

Equations (1) to (16) above also satisfy the above algorithm.

Note that if the detection unit 402 in FIG. 4 compares the pixel values P0 and Q0 of two pixels M0 and N0 adjacent on opposite sides of the boundary line, and the absolute value |P0−Q0| of the difference between the pixel values is less than or equal to a specific threshold value, the switch 403 closes to node b and outputs the original pixel value or outputs the pixel value before adjustment, but if the absolute value |P0−Q0| is greater than the specific threshold value, the switch 403 closes to node a and outputs the adjusted value.

Alternatively, the detection unit 402 may receive the absolute values |HPF(M0)| and |HPF(N0)| of the high-pass filter values, set the switch 403 to node a if either absolute value is greater than or equal to a specific value, and set the switch 403 to node b if both absolute values are less than the specific value.

Further alternatively, the detection unit 402 may use these two methods together, or may switch the switch 403 based on some other standard.

The invention is described above with reference to adjusting adjacent pixels M0 and N0 on opposite sides of the boundary line, but the invention may also be used to adjust the pixels M1, M2, M3, Q1, Q2, Q3 near the boundary line.

Figure 13:
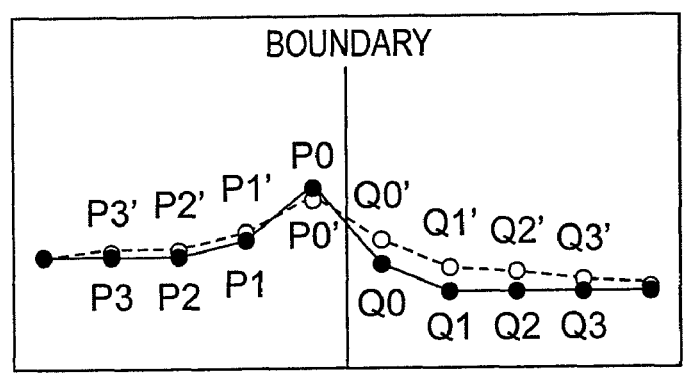
FIG. 13 is a schematic view describing the operation of removing block noise according to the present invention.
Figure 14:
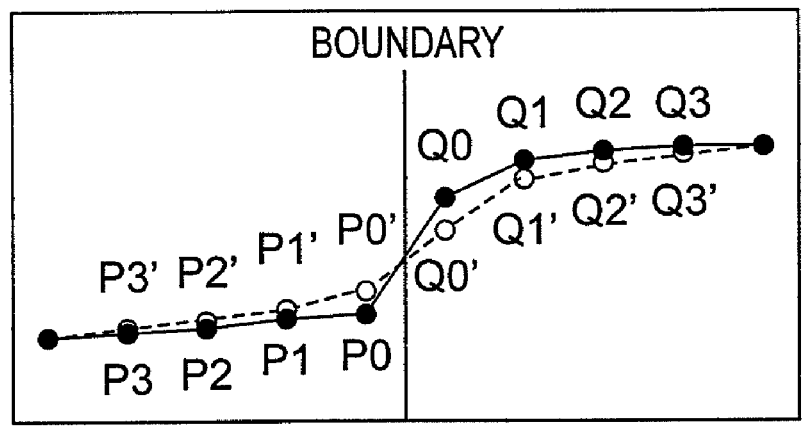
FIG. 14 is a schematic view describing the operation of removing block noise according to the present invention.
Figure 15:
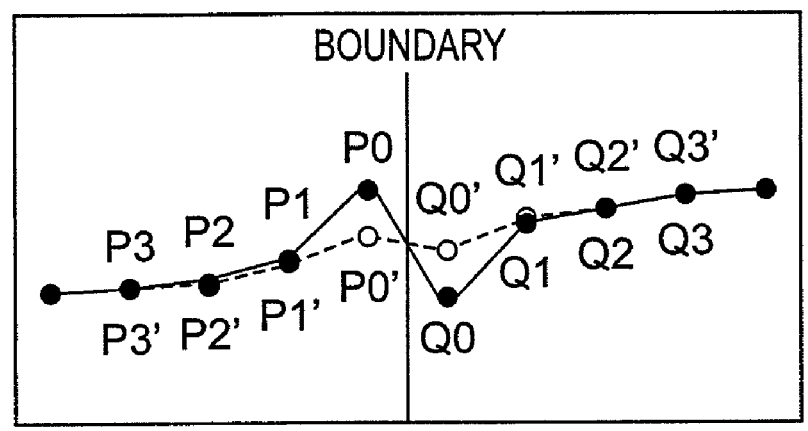
FIG. 15 is a schematic view describing the operation of removing block noise according to the present invention.

Three examples of block noises are shown in FIG. 13, FIG. 14, and FIG. 15. The original pixel values are denoted by a solid black circle, and the adjusted values are denoted by a white circle. An abnormal difference between original pixel values at pixel M0 and pixel N0 produces a vertical block noise at the block boundary. Definition can be determined by the high-pass filter. In the example shown in FIG. 13 and FIG. 14, the definition of pixel M0 is greater than the definition of pixel N0. As a result, the adjusted value P0' is closer to the corresponding original value than the filtered value determined by the low-pass filter. On the other hand, the adjusted value Q0' is farther from the corresponding original value than the filtered value.

In the example shown in FIG. 15, the definition of pixel M0 and pixel N0 is the same. As a result, the adjusted values P0' and Q0' are equal to the filtered values. The adjusted values P1', P2', P3', Q1', Q2' and Q3' are also determined and eliminate abnormal discontinuities.

The present invention can remove block noises and retain definition because the definition on each side of the block boundary is determined through a weight calculation using the adjusted values of pixels near the block boundary that are determined by a high-pass filter and calculating the weighted sum of the original pixel value and the filtered value.

Figure 16:
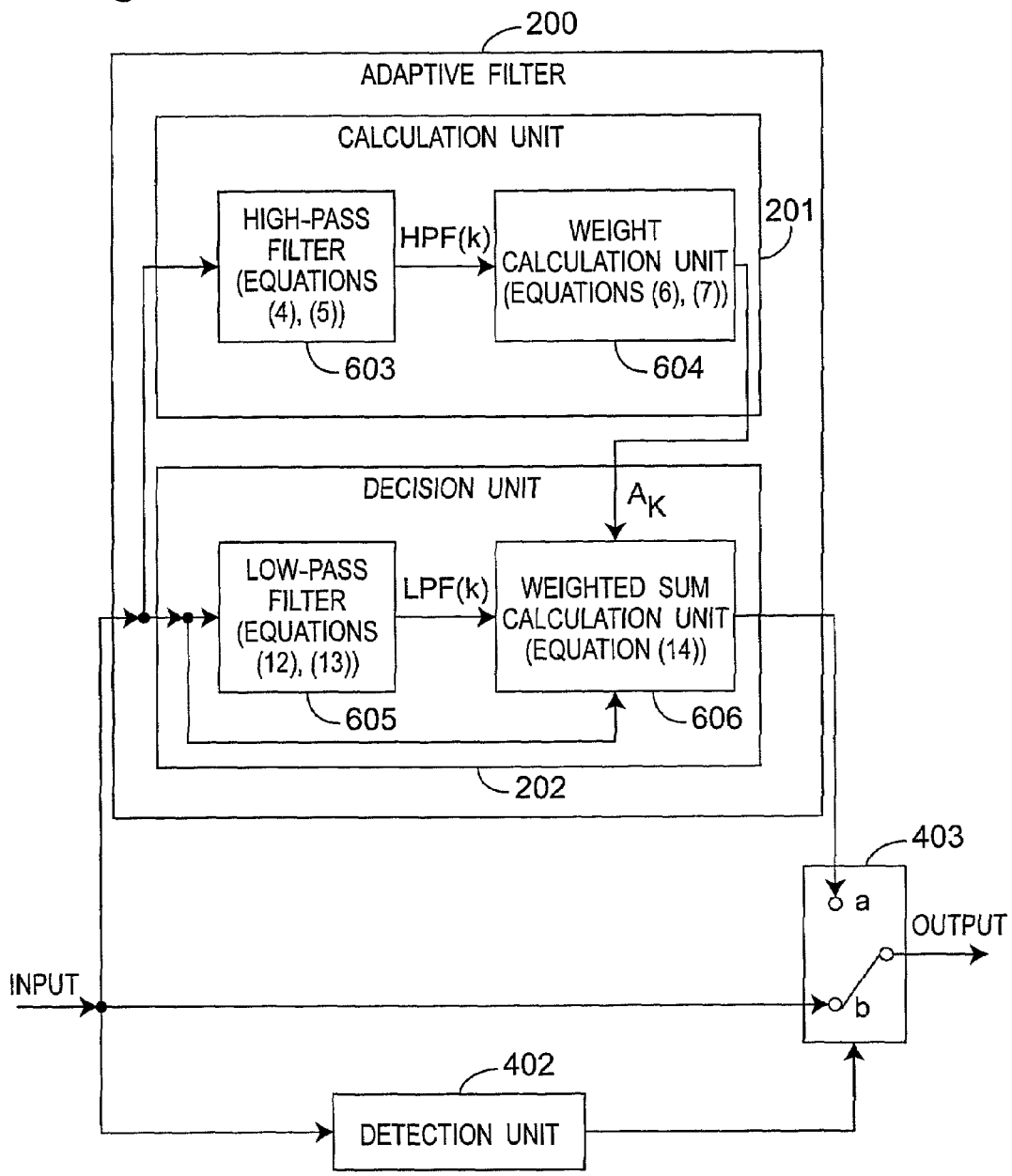
FIG. 16 is a block diagram of an apparatus according to the present invention that reduces block noise.

FIG. 16 combines FIG. 2, FIG. 4, and FIG. 6 in one drawing. The circuit shown in FIG. 16 can be rendered in one or a plurality of integrated circuit devices.

Figure 17:
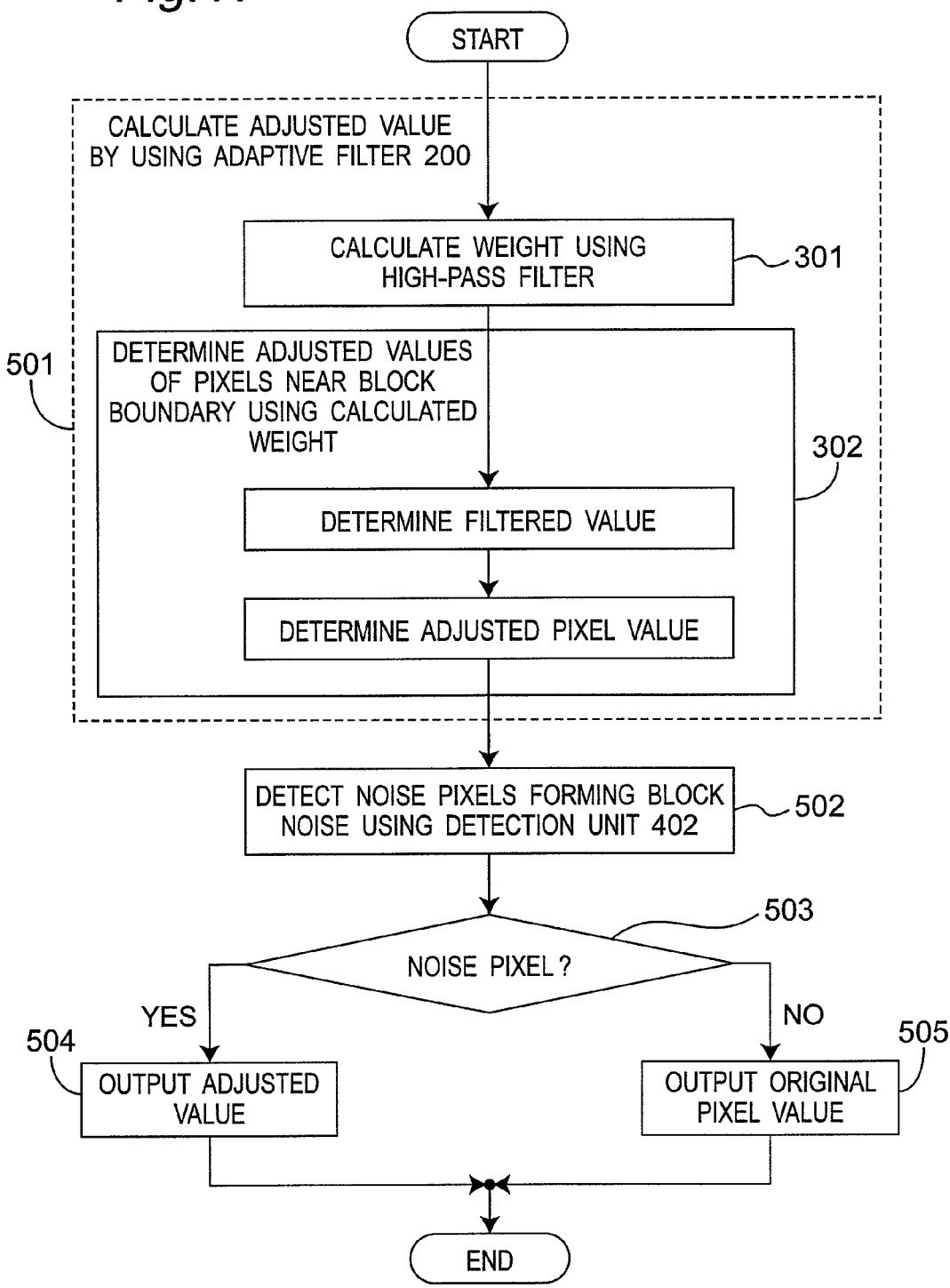
FIG. 17 is a flow chart describing a calculation process using the apparatus of the invention shown in FIG. 4 for reducing block noise.

FIG. 17 combines FIG. 3 and FIG. 5 in one flow chart.

The invention can also be rendered as a computer program.

<Variations of the Invention>

The invention is described above with reference to preferred embodiments thereof, but the invention is obviously not limited to the foregoing embodiments and can be varied in many ways by one with ordinary skill in the related art. The following configurations are also included in the scope of the present invention.

(1) The devices described above are more specifically a computer system including a microprocessor, ROM, RAM, a hard disk storage unit, a display unit, a keyboard, and mouse, for example. A computer program is stored in RAM or the hard disk storage unit. The foregoing devices perform their respective functions as a result of the microprocessor operating according to the computer program. The computer program is a compilation of command codes for sending instructions to the computer to render the specific functions.

(2) One or all parts of the components rendering the foregoing devices may be rendered in a single system LSI (large scale integration) device. A system LSI is a multifunctional integrated circuit device manufactured with a plurality of functional units rendered on a single chip, and more specifically is a computer system including a microprocessor, ROM and RAM. A computer program is stored in RAM or the hard disk storage unit. The system LSI renders the functions as a result of the microprocessor operating according to the computer program.

(3) One or all parts of the components rendering the foregoing devices may be rendered in a removable IC card or a discrete module. The IC card or a discrete module is a computer system including a microprocessor, ROM and RAM. The IC card or a discrete module may include a system LSI as described above. The IC card or a discrete module renders the functions as a result of the microprocessor operating according to the computer program. The IC card or a discrete module may be tamper-resistant.

(4) The invention can be the method as described above. The method may be rendered as a computer program that is run by a computer, and may be a digital signal composed of the computer program.

The invention can be rendered as the computer program or digital signal recorded on a computer-readable recording medium such as a floppy disk, a hard disk, CD-ROM, MO, DVD, DVD-ROM, DVD-RAM, or BD (BluRay Disc) media, or semiconductor memory device. The invention may also be the digital signal recorded to such a recording medium.

The invention can also transmit the computer program or digital signal over an electrical communication line, a wireless or wired communication connection, a network such as the Internet, or a data broadcast medium, for example.

The invention can also be a computer system having a microprocessor and memory, the memory storing the computer program, and the microprocessor operating according to the computer program.

Further alternatively, the invention can be rendered by another independent computer system by conveying the computer program or digital signal stored on the recording medium, or by conveying the computer program or digital signal over a network or other communication means.

(5) The invention can also be rendered by various combinations of the embodiments and variations described above.

<Industrial Applicability>

The present invention can be used in a method and apparatus for reducing block noise.

The invention claimed is:

1. A method of removing block noise, comprising:
receiving pixel values for a first pixel and a second pixel on opposite sides of a boundary between two adjacent blocks, and acquiring a high-pass filter value of the first pixel and the second pixel;
obtaining a weight of the first pixel and the second pixel based on the high-pass filter value of the first pixel and the second pixel;
obtaining a low-pass filter value of the first pixel and a low-pass filter value of the second pixel; and
obtaining an adjusted value of the low-pass filter value of the first pixel and an adjusted value of the low-pass filter value of the second pixel based on the weight of the first pixel and the second pixel, the weight of the first pixel and the second pixel being obtained based on the high-pass filter value of the first pixel and the second pixel.

2. The method of removing block noise described in claim 1, wherein:
the adjusted value of the first pixel is one of an internal division point and an external division point, between the pixel value and the low-pass filter value of the first pixel, and
the adjusted value of the second pixel is an other one of the internal division point or the external division point, between the pixel value and the low-pass filter value of the second pixel.

3. The method of removing block noise described in claim 1, further comprising:
detecting if there is a block noise;
wherein the adjusted value is used if there is a block noise, and the original pixel value is used if there is no block noise.

4. An apparatus that removes block noise, comprising:
a high-pass filter that receives pixel values for a first pixel and a second pixel on opposite sides of a boundary between two adjacent blocks, and acquires a high-pass filter value of the first pixel and the second pixel;
a weight calculator that obtains a weight of the first pixel and the second pixel based on the high-pass filter value of the first pixel and the second pixel;

a low-pass filter that obtains a low-pass filter value of the first pixel and a low-pass filter value of the second pixel; and a weighted sum calculator that obtains an adjusted value of the low-pass filter value of the first pixel and an adjusted value of the low-pass filter value of the second pixel based on the weight of the first pixel and the second pixel, the weight of the first pixel and the second pixel being obtained based on the high-pass filter value of the first pixel and the second pixel.

5. The apparatus that removes block noise described in claim 4, wherein:

the adjusted value of the first pixel is one of an internal division point and an external division point, between the pixel value and the low-pass filter value of the first pixel, and the adjusted value of the second pixel is an other one of the internal division point or the external division point, between the pixel value and the low-pass filter value of the second pixel.

6. The apparatus that removes block noise described in claim 4, further comprising:

a detector that detects if there is a block noise;

wherein the adjusted value is used if there is a block noise, and the original pixel value is used if there is no block noise.

7. A non-transitory computer readable medium enabling executing the method of removing block noise described in claim 1.

8. An integrated circuit device rendering the apparatus that removes block noise described in claim 4.

* * * * *